No. 638,842. Patented Dec. 12, 1899.
A. GLENN.
STOCK WATERER.
(Application filed Dec. 31, 1898.)
(No Model.) 2 Sheets—Sheet 1.
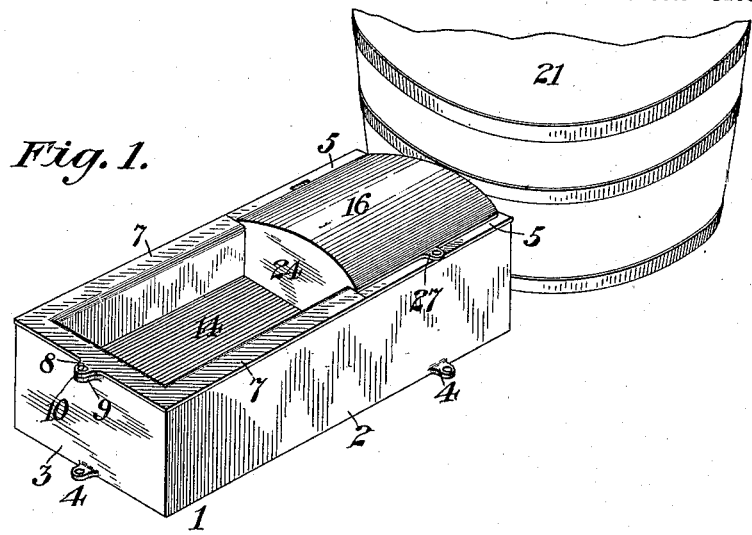
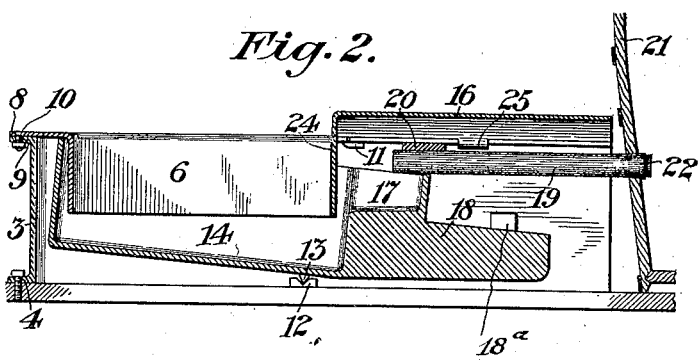
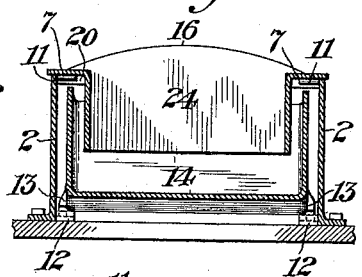
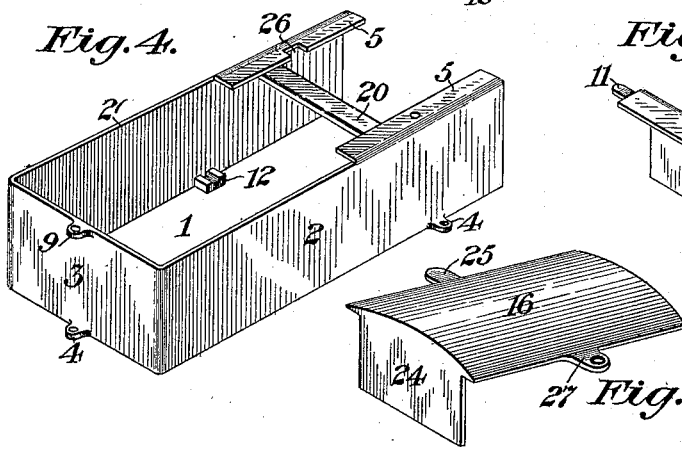
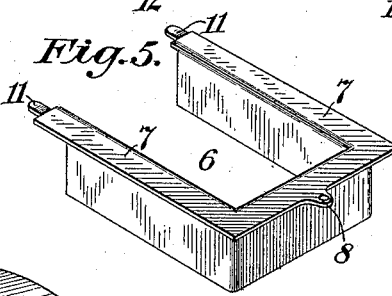
Witnesses
O. W. Smith
H. F. Riley
By his Attorneys,
C. A. Snow & Co.
Inventor
Allen Glenn No. 638,842.  
A. GLENN.  
STOCK WATERER.  
(Application filed Dec. 31, 1898.)  
(No Model.)

Patented Dec. 12, 1899.

2 Sheets—Sheet 2.

Witnesses  
O. W. Smith  
J. H. Riley

By his Attorneys,  
C. A. Snow & Co.

Inventor  
Allen Glenn

UNITED STATES PATENT OFFICE.

ALLEN GLENN, OF SCRANTON, IOWA.

STOCK-WATERER.

SPECIFICATION forming part of Letters Patent No. 638,842, dated December 12, 1899.

Application filed December 31, 1898. Serial No. 700,850. (No model.)

*To all whom it may concern:*

Be it known that I, ALLEN GLENN, a citizen of the United States, residing at Scranton, in the county of Greene and State of Iowa, have invented a new and useful Stock-Waterer, of which the following is a specification.

The invention relates to improvements in stock-waterers.

The object of the present invention is to improve the construction of stock-waterers and to provide a simple, inexpensive, and efficient one adapted to dispense with leather valves which dry up and rot and floats which leak and become water-logged and capable of automatically regulating the flow of water according to the consumption thereof and of preventing hogs and other animals from holding the valve or cut-off open and wasting the water.

The invention consists in the construction and novel combination and arrangement of parts, as hereinafter fully described, illustrated in the accompanying drawings, and pointed out in the claims hereto appended.

Figure 7:
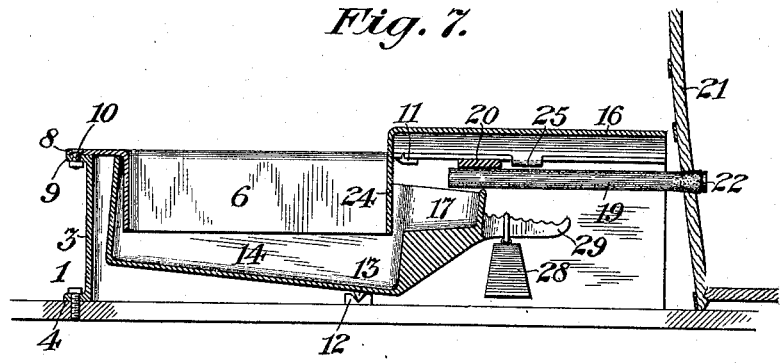
Figure 8:
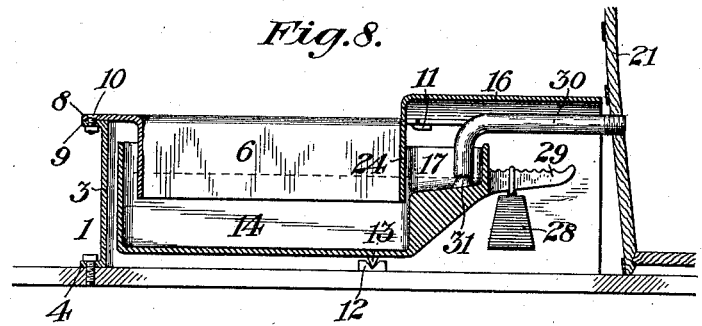
Figure 9:
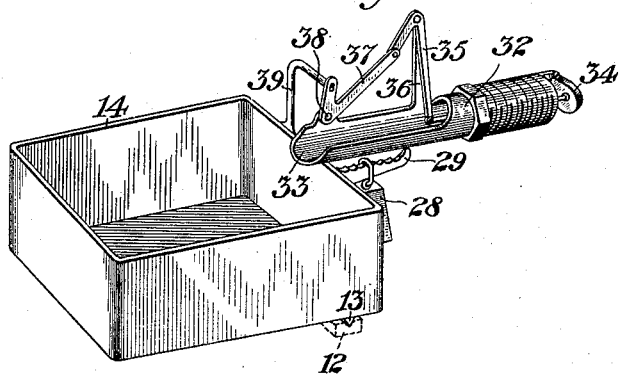

In the drawings, Figure 1 is a perspective view of a stock-waterer constructed in accordance with this invention and shown applied to a barrel. Fig. 2 is a longitudinal sectional view of the same. Fig. 3 is a transverse sectional view. Fig. 4 is a detail perspective view of the outer casing. Fig. 5 is a similar view of the inner casing. Fig. 6 is a detail perspective view of the shield or cover. Fig. 7 is a longitudinal sectional view illustrating a modification of the invention. Fig. 8 is a similar view showing another form of the invention. Fig. 9 is a perspective view illustrating a further modification of the stock-waterer.

Like numerals of reference designate corresponding parts in all the figures of the drawings.

1 designates an outer casing composed of parallel sides 2 and a front 3 and provided at the lower edges of such parts with horizontally-projecting ears or portions 4, which are perforated for the reception of screws for securing the stock-waterer to a plank or platform. The back of the frame is open, and the sides are provided in rear of the center with inwardly-extending horizontal flanges 5, located at the top of the casing.

Within the front portion of the outer casing is arranged an inner casing 6, composed of a front portion and similar sides spaced from the inner faces of the front and sides of the outer casing and provided at their upper edges with horizontal flanges 7, which rest upon the upper edges of the outer casing. The inner casing is provided at the edge of its front or forwardly-projecting flange with a perforated ear 8, which is secured to a corresponding ear 9 of the outer casing by means of a bolt 10 or other suitable fastening device. The rear ends of the side flanges of the inner casing are provided with tongues 11, which engage under the inwardly-extending rear flanges of the outer casing. This construction detachably secures the inner casing to the outer one. The outer casing is provided at opposite sides with bearings 12 to receive tapering depending projections 13, which pivot or fulcrum the drinking trough or cup 14 on the outer casing, and the said bearings 12, which are open, are substantially V-shaped and enable the drinking trough or cup to be removed when the inner casing and a shield or cover 16 are detached. The sides and front of the drinking trough or cup 14 are arranged in the spaces between the inner and outer casings to protect the trough or cup and prevent hogs and other animals from interfering with the operation of the cut-off. The back of the drinking-trough is provided with an extension 17 and carries a weight 18, which may be rigid with the trough or cup, as illustrated in Fig. 2 of the accompanying drawings, or which may be adjustable, as shown in Figs. 7, 8, and 9, and the upper edge of the rearward extension 17 forms a jaw and is adapted to engage a rubber tube 19 and compress or constrict the same against a transverse bar 20 to form a choke-valve or cut-off. The rubber tube, which forms a supply-pipe, is connected with a barrel 21 or other suitable tank or reservoir, and its inner end is expanded by a tapering tube 22 to provide a tight joint and prevent leakage at the point of attachment of the tube of the supply-pipe and the barrel. The transverse bar 20, which forms an upper jaw for the cut-off or valve, connects the horizontal flanges of the outer casing and braces the sides of the same. Instead of employing the form of valve illustrated in Fig.

2 other forms can be used, as shown in Figs. 7, 8, and 9. The weight partially counterbalances the drinking trough or cup and the contents thereof, and when the water is nearly consumed the weight tilts the receptacle or trough upwardly and opens the valve of the supply-pipe and permits the water to be replenished. When the water rises in the trough or cup to a point near the top thereof, its weight overbalances the weight 18 and swings the trough downward, thereby shutting off the flow of water.

In order to prevent the animals from coming in contact with the weight and the supply-pipe and to protect the valve mechanism, the device is provided with a shield or cover 16, consisting of a transversely-curved upper portion and a depending vertical front portion 24, located in advance of the rearward extension of the cup or trough. The shield or cover is provided at one side with a tongue 25, which engages a recess 26 of one of the horizontal flanges of the outer casing, and the other side of the cover or shield is provided with a projection or ear 27, secured to the adjacent horizontal flange 5 by a bolt passing through the same; but any other suitable fastening device may be employed for this purpose. By this construction one side of the cover is detachably secured to the frame or housing and the other side is detachably interlocked with the same.

The modification illustrated in Fig. 7 of the accompanying drawings is provided with an adjustable weight 28, suspended by a loop or hanger from an arm 29, which projects horizontally from the rearward extension of the trough or cup and is provided with notches or recesses to prevent the weight from slipping when the trough or cup tilts. The rest of the construction is similar to that heretofore described.

The modification illustrated in Fig. 8 of the drawings has another form of valve or cut-off, the supply-pipe 30 being bent downward at its outer end to provide a vertical arm, and the rear portion of the cup or trough carries a plug or stopper 31, of rubber or other suitable material, adapted when the water rises to the desired height in the cup or trough to close the end of the pipe 30 and shut off the flow of water.

Fig. 9 of the drawings shows another form of cut-off, and the supply-pipe 32, which has its inner portion threaded, is adapted to be screwed into a barrel or reservoir, and its outer portion is open at the top to provide a spout 33, a valve 34 being arranged at the inner end thereof. The valve 34 is mounted on a depending vertical arm of a V-shaped bell-crank lever 35, which is fulcrumed at its angle on an arm or extension 36 of the supply-pipe. Its other arm, which is arranged at an inclination, is pivoted to an inclined arm of a reversely-arranged bell-crank lever 37, which has its vertical arm extending upward from the pivot 38 and connected with a substantially L-shaped rod or piece 39 of the trough or cup, whereby when the latter tilts upward the vertical arm of the bell-crank lever 37 will be swung rearward to operate the other bell-crank lever 35 and open the valve or cut-off.

In order to enable the height of the water within the trough to be regulated when the device is provided with the fixed weight 18, a supplemental adjustable weight $18^a$ is provided, and by moving the same to and from the fulcrum the quantity of water necessary to effect a cut-off may be varied.

The invention has the following advantages: The stock-waterer is simple and inexpensive in construction and positive, reliable, and automatic in operation, and it is adapted to dispense with leather valves and floats, which are liable to leak or become water-logged. The cut-off or valve is not operated by the animal, so that he cannot hold the valve or cut-off open and waste the water, and any pressure on the bottom of the trough or cup operates to seat the valve or close the cut-off more securely.

Changes in the form, proportion, and minor details of construction may be resorted to without departing from the spirit or sacrificing any of the advantages of this invention.

What is claimed is—

1. A stock-waterer comprising a flexible supply-pipe, a tilting trough or cup, and a weight rigid with the trough or cup and adapted to counterbalance the same and its contents partially, and a jaw rigid with the weight and arranged to engage the flexible supply-tube to cut off the flow of water, substantially as described.

2. A stock-waterer comprising the inner and outer casings having vertical sides spaced apart, a tilting trough having its sides operating in the intervening spaces between the casings, and a cut-off operated by the tilting trough and adapted to control the supply of water, substantially as described.

3. A stock-waterer comprising an outer casing, an inner casing detachably secured to the outer casing and provided at its top with flanges resting upon the upper edges of the same, a tilting trough mounted within the outer casing and operating in the space between the same and the inner casing, a cut-off arranged at the back of the trough, and a shield or cover consisting of a top portion and a depending front portion, said shield or cover being arranged to protect the cut-off, substantially as described.

4. A stock-waterer comprising an outer casing provided at its back with inwardly-extending flanges, an inner casing located in front of the said flanges and provided at its top with horizontal flanges detachably secured to the outer casing, a transverse bar connecting the rear portions of the sides of the outer casing and forming a jaw, a tilting trough operating in the space between the casings and provided at its back with a jaw arranged to compress a supply-pipe between it and the transverse bar, and the shield or cover mounted on the rear flanges of the outer frame and having a depending front portion, substantially as described.

5. A stock-waterer comprising an outer casing provided at its back with flanges, one of the flanges being notched, an inner casing arranged within the outer casing and provided at its top with horizontal flanges having tongues interlocked with the flanges of the outer casing, a shield or cover provided at one side with a hook or tongue interlocked with the notched flange of the outer casing, the other side of the shield or cover being detachably secured to the other flange of the outer casing, a tilting drinking-trough arranged in the space between the casings, and a cut-off operated by the trough, substantially as described.

In testimony that I claim the foregoing as my own I have hereto affixed my signature in the presence of two witnesses.

ALLEN GLENN.

Witnesses:
A. T. Cox,
Wm. P. Cox.